United States Patent
Feng et al.

(10) Patent No.: US 11,834,373 B2
(45) Date of Patent: Dec. 5, 2023

(54) OIL SHALE SEMICOKE ADSORPTION INHIBITOR AND APPLICATION THEREOF IN CONCRETE PREPARATION

(71) Applicants: Gansu Zhitong Technology Engineering Detection Consulting Co., Ltd., Gansu (CN); GANSU ROAD & BRIDGE CONSTRUCTION GROUP, Gansu (CN)

(72) Inventors: Yuee Feng, Gansu (CN); Hui Dou, Gansu (CN); Xiaohui Fan, Gansu (CN); Minmin Niu, Gansu (CN); Juan Li, Gansu (CN); Huiping Zhang, Gansu (CN); Yongfeng Wei, Gansu (CN); Junjie Xie, Gansu (CN); Yan He, Gansu (CN); Yafei Li, Gansu (CN)

(73) Assignees: Gansu Zhitong Technology Engineering Detection Consulting Co., Ltd., Lanzhou (CN); GANSU ROAD & BRIDGE CONSTRUCTION GROUP, Lanzhou (CN)

(*) Notice: Subject to any disclaimer, the term of this patent is extended or adjusted under 35 U.S.C. 154(b) by 7 days.

(21) Appl. No.: 17/993,987

(22) Filed: Nov. 24, 2022

(65) Prior Publication Data
US 2023/0257305 A1     Aug. 17, 2023

Related U.S. Application Data

(63) Continuation of application No. PCT/CN2022/108559, filed on Jul. 28, 2022.

(30) Foreign Application Priority Data

Jan. 17, 2022   (CN) ........................ 202210048304.X

(51) Int. Cl.
| | |
|---|---|
| C04B 24/42 | (2006.01) |
| C04B 28/02 | (2006.01) |
| C04B 24/20 | (2006.01) |
| C04B 24/12 | (2006.01) |
| C04B 24/02 | (2006.01) |
| C04B 18/08 | (2006.01) |
| C04B 18/12 | (2006.01) |
| C04B 20/02 | (2006.01) |
| C04B 111/26 | (2006.01) |
| C04B 103/61 | (2006.01) |
| C04B 103/00 | (2006.01) |

(52) U.S. Cl.
CPC ............ *C04B 28/026* (2013.01); *C04B 18/08* (2013.01); *C04B 18/125* (2013.01); *C04B 20/026* (2013.01); *C04B 24/02* (2013.01); *C04B 24/123* (2013.01); *C04B 24/20* (2013.01); *C04B 24/42* (2013.01); *C04B 2103/0079* (2013.01); *C04B 2103/61* (2013.01); *C04B 2111/26* (2013.01)

(58) Field of Classification Search
CPC ..... C04B 28/026; C04B 18/08; C04B 18/125; C04B 20/026; C04B 24/02; C04B 24/123; C04B 24/20; C04B 24/42; C04B 2103/0079; C04B 2103/61; C04B 2111/26; C04B 28/02; C04B 18/06; C04B 18/04; C04B 18/088; C04B 18/106; C04B 24/223; C04B 24/04; C04B 24/08; C04B 24/085
See application file for complete search history.

(56) References Cited

FOREIGN PATENT DOCUMENTS

| | | | |
|---|---|---|---|
| CN | 113429579 A | * | 9/2021 |
| CN | 113527766 A | * | 10/2021 |
| CN | 114230223 A | * | 3/2022 |
| FR | 2693128 A1 | * | 1/1994 ........... C04B 18/147 |

OTHER PUBLICATIONS

CN-114230223-A, machine translation (Year: 2022).*
FR-2693128-A1, machine translation (Year: 1994).*
CN-113429579-A, machine translation (Year: 2021).*
CN-113527766-A, machine translation (Year: 2021).*

* cited by examiner

*Primary Examiner* — Kevin E Yoon
*Assistant Examiner* — Marites A Guino-O Uzzle

(57) ABSTRACT

The present disclosure discloses an oil shale semicoke adsorption inhibitor and use thereof in concrete preparation. The adsorption inhibitor is prepared by the following steps: sequentially adding 50-52.5 weight parts of an anti-corrosion rheological agent, 5-20 weight parts of methanol, 0.5-2 weight parts of sulfonated melamine, 2-5 weight parts of EDTA, 20-30 weight parts of an organosilicon compound, and 5-10 weight parts of stearate into a mixing container, and performing stirring well. The anti-corrosion rheological agent is a microbead. The adsorption inhibitor solves problems of strong water absorption, high adsorption of a water reducing agent, etc. of oil shale semicoke, reduces the use amount of the water reducing agent in concrete production, and can also reduce power consumption during grinding, thereby realizing high-value resource utilization of the oil shale semicoke.

12 Claims, No Drawings

OIL SHALE SEMICOKE ADSORPTION INHIBITOR AND APPLICATION THEREOF IN CONCRETE PREPARATION

CROSS REFERENCE TO RELATED APPLICATION

This application is a continuation application of PCT application No. PCT/CN2022/108559 filed on Jul. 28, 2022, which claims priority from Chinese Patent Application No. 202210048304.X filed on Jan. 17, 2022 and entitled "oil shale semicoke adsorption inhibitor and use thereof in concrete preparation", each of which is incorporated by reference herein in its entirety.

FIELD OF TECHNOLOGY

The present disclosure relates to the technical field of utilization of industrial solid waste, particularly to a resource utilization technology of oil shale semicoke as a concrete material, specifically to an adsorption inhibitor of the oil shale semicoke. The present disclosure further relates to a use of the adsorption inhibitor in concrete preparation.

BACKGROUND

Oil shale, also called as kerogen shale, is a high ash sedimentary rock containing combustible organic matter, belongs to fossil fuel like coal, petroleum and natural gas, and is a non-renewable resource and a primary energy source. During a retorting and oil-refining process of the oil shale, a large amount of byproduct waste, namely oil shale semicoke, is produced. The oil shale semicoke is an inferior fuel with high ash content and low calorific value, contains toxic pollutants such as water-soluble phenol, sulfide and polycyclic aromatic hydrocarbon, and causes severe harm to the environment if not treated properly.

At present, most of the oil shale semicoke is subjected to a stacking treatment at home and abroad, such that a large amount of available cultivated land is occupied, water resource is polluted, water quality is deteriorated, and resource waste is caused. As an additional product of the oil shale, the oil shale semicoke is also often used as a concrete material for construction. However, in practical use, since the oil shale semicoke powder is loose and porous, the oil shale semicoke powder has strong water absorption and extremely strong adsorbability on a water reducing agent added in the concrete preparation process, such that the use amount of the water reducing agent is increased, workability and the like of the concrete are also deteriorated at the same time, on-site pouring construction is affected, and the resource utilization of the oil shale semicoke is greatly limited.

SUMMARY

The present disclosure provides an oil shale semicoke adsorption inhibitor. The oil shale semicoke adsorption inhibitor can solve problems that oil shale semicoke is loose and porous, and has strong adsorption to a water reducing agent, and promotes use in concrete, thereby realizing high-value utilization of the oil shale semicoke.

The present disclosure further provides a use of the oil shale semicoke adsorption inhibitor in concrete preparation.

The present disclosure provides an oil shale semicoke adsorption inhibitor, wherein the adsorption inhibitor is prepared by the following steps: sequentially adding 50-52.5 weight parts of an anti-corrosion rheological agent, 5-20 weight parts of methanol, 0.5-2 weight parts of sulfonated melamine, 2-5 weight parts of EDTA (Ethylene Diamine Tetraacetic Acid), 20-30 weight parts of an organosilicon compound, and 5-10 weight parts of stearate into a mixing container, and performing stirring well.

The anti-corrosion rheological agent is a microbead type of active microaggregate with water-reducing property.

As a preferred technical solution of the present disclosure, the organosilicon compound is selected from a mixture of one or more of sodium methylsiliconate, sodium perfluorosiliconate, polymethylvinylsiloxane (PMVS) or a cyclopentyl methacrylate-cubic polyhedral oligomeric silsesquioxane (POSS) nanocomposite.

Further, the stearate is a mixture of calcium stearate and zinc stearate.

Further, a mass ratio of the calcium stearate and the zinc stearate is 2:1.

During use of the adsorption inhibitor of the present disclosure, mixing the adsorption inhibitor into the oil shale semicoke, and then mixing into the concrete to be used. The adsorption inhibitor is mixed into the oil shale semicoke at a weight ratio of 0.05-0.3 wt %, preferably 0.08-0.1 wt %. The weight ratio of the adsorption inhibitor in the oil shale semicoke is 0.05-0.3 wt %, preferably 0.08-0.1 wt % considering performance, cost and other factors.

In one embodiment of mixing method, during a grinding process of the oil shale semicoke in a grinder, the adsorption inhibitor is added into the grinder from a grinding head ground into fine powder according to a preset weight ratio and the fine powder of the mixture is added into the concrete to be used.

In another embodiment of mixing method, grinding the oil shale semicoke and the adsorption inhibitor to a fine powder separately, and mixing the two fine powers uniformly by a mixer according to a preset weight ratio of the adsorption inhibitor and the mixture is added into the concrete to be used.

In another embodiment of mixing method, when stirring the concrete, mixing the oil shale semicoke fine powder and the adsorption inhibitor fine power separately into the concrete according to a preset weight ratio a preset weight ratio of the adsorption inhibitor in the oil shale semicoke.

By using the above technical solutions, the present disclosure achieves the following beneficial effects:

1. In the present disclosure, the adsorption inhibitor is mixed into oil shale semicoke powder who usually taken as industrial solid waste, solves problems of strong water absorption, high adsorption of a water reducing agent, etc. of oil shale semicoke, reduces the use amount of the water reducing agent in concrete preparation, obtains concrete with good workability, and can also reduce power consumption during grinding due to a certain dispersing and grinding-aid effect, thereby realizing resource utilization of a large amount of the oil shale semicoke in cement-based concrete and high-value resource utilization of the oil shale semicoke.

2. In the present disclosure, the raw materials are easily obtained and easy to process, a formula design of raw materials is reasonable, the cost is low, and full utilization of renewable resources is realized.

3. The addition of methanol and the sulfonated melamine in the inhibitor of the present disclosure provides certain water reducing performance and air entraining performance, and can solve problems that the oil shale semicoke has poor adsorption, water absorption, fluidity and the like.

4. The introduction of EDTA into the inhibitor of the present disclosure can effectively complex iron ions in the oil shale semicoke and reduce the complexation between the EDTA and a polycarboxylate water reducing agent, thereby improving stability of a working performance of the concrete.

The organosilicon compound and stearate are added in the present disclosure, and generate a layer of an insoluble waterproof high molecular compound-a reticular organosilicon resin film of several molecular thicknesses on surfaces of oil shale semicoke powder particles under the action of carbon dioxide, water and the like. The film can seal partial open pores of the oil shale semicoke powder particles and improve a gap structure of the oil shale semicoke powder particles. Meanwhile, the stearate has a relatively strong hydrophobic function, can improve tortuosity of gaps of the oil shale semicoke powder particles, and can further improve a pore structure of the concrete, thereby reducing water absorption and adsorption, and improving pore structures of mortar, concrete and the like, and anti-permeability capability of a pouring body.

6. The adsorption inhibitor of the present disclosure can be used for oil shale semicoke as well as coal gangue, furnace slag and the like.

DESCRIPTION OF THE EMBODIMENTS

The composition, the use method and the effect of the oil shale semicoke adsorption inhibitor of the present disclosure will be described in detail below with reference to specific examples.

In the following examples of the present disclosure, EDTA is chemical-grade ethylenediamine tetraacetic acid disodium; stearate is a mixture of industrial-grade calcium stearate and industrial-grade zinc stearate (2:1, w:w); an anti-corrosion rheological agent is a fly ash microbead purchased from Shenzhen Tongcheng New Material Technology Co., Ltd.; and the adding amount means to a weight ratio is in mass fraction.

The examples of the present disclosure provide an oil shale semicoke adsorption inhibitor. The adsorption inhibitor is prepared by the following steps: sequentially adding weight parts of an anti-corrosion rheological agent, 5-20 weight parts of methanol, weight parts of sulfonated melamine, 2-5 weight parts of EDTA, 20-30 weight parts of an organosilicon compound, and 5-10 weight parts of stearate into a mixing container, and performing full and uniform stirring. The anti-corrosion rheological agent is a fly ash microbead.

The fly ash microbead, also called a "microbead" water-reducing active microaggregate, known as a floating bead, is a highly active spherical glass body obtained after collection of fly ash discharged from chimneys of coal-fired thermal power plants. The fly ash generally contains 50-80% of hollow glass microspheres. The inventors of the present disclosure provide an adsorption inhibitor using the fly ash microbead, the sulfonated melamine, the methanol, etc. The adsorption inhibitor is mixed into industrial solid waste oil shale semicoke powder, solves problems of strong water absorption, high adsorption of a water reducing agent, etc. of oil shale semicoke, reduces the use amount of the water reducing agent in concrete production, obtains concrete with good workability, and can also reduce power consumption during grinding due to a certain dispersing and grinding-aid effect, thereby realizing resource utilization of a large amount of the oil shale semicoke in cement-based concrete and high-value resource utilization of the oil shale semicoke.

Example 1

The present example provided an oil shale semicoke adsorption inhibitor, wherein the adsorption inhibitor was prepared by the following steps: sequentially adding 52 weight parts of an anti-corrosion rheological agent (fly ash microbead), 5 weight parts of methanol, 2 weight parts of sulfonated melamine, 5 weight parts of EDTA, 30 weight parts of a mixture of sodium perfluorosiliconate and polymethylvinylsiloxane at a mass ratio of 5:1, and 6 weight parts of stearate into a mixing container, and performing full and uniform stirring.

The adding amount of the adsorption inhibitor in the oil shale semicoke is 0.05 wt %.

Example 2

The present example provided an oil shale semicoke adsorption inhibitor, wherein the adsorption inhibitor was prepared by the following steps: sequentially mixing 50.5 weight parts of an anti-corrosion rheological agent (fly ash microbead), 10 weight parts of methanol, 1.5 weight parts of sulfonated melamine, 3 weight parts of EDTA, 25 weight parts of an organosilicon compound (a mixture of sodium methylsiliconate, sodium perfluorosiliconate, and a cyclopentyl methacrylate-cubic polyhedral oligomeric silsesquioxane nanocomposite at a mass ratio of 2:2:1), and 10 weight parts of stearate into a mixing container, and performing stirring well.

The adding amount of the adsorption inhibitor in the oil shale semicoke is 0.08 wt %.

Example 3

The present example provided an oil shale semicoke adsorption inhibitor, wherein the adsorption inhibitor was prepared by the following steps: sequentially adding 50.5 weight parts of an anti-corrosion rheological agent (fly ash microbead), 15 weight parts of methanol, 1.5 weight parts of sulfonated melamine, 3 weight parts of EDTA, 25 weight parts of an organosilicon compound (a mixture of sodium methylsiliconate, sodium perfluorosiliconate, and a cyclopentyl methacrylate-cubic polyhedral oligomeric silsesquioxane nanocomposite at a mass ratio of 2:1:2), and 5 weight parts of stearate into a mixing container, and performing full and uniform stirring.

The weight ratio of the adsorption inhibitor in the oil shale semicoke is 0.10 wt %.

Example 4

The present example provided an oil shale semicoke adsorption inhibitor, wherein the adsorption inhibitor was prepared by the following steps: sequentially adding 52.5 weight parts of an anti-corrosion rheological agent (fly ash microbead), 20 weight parts of methanol, 0.8 weight parts of sulfonated melamine, 2 weight parts of EDTA, 20 weight parts of an organosilicon compound (a mixture of sodium methylsiliconate, sodium perfluorosiliconate, polymethyl vinyl siloxane (PMVS, and a cyclopentyl methacrylate-cubic polyhedral oligomeric silsesquioxane nanocomposite at a mass ratio of 1:1:1:1), and 5 weight parts of stearate into a mixing container, and performing full and uniform stirring.

The weight ratio of the adsorption inhibitor in the oil shale semicoke is 0.2 wt %.

Example 5

The present example provided an oil shale semicoke adsorption inhibitor, wherein the adsorption inhibitor was prepared by the following steps: sequentially adding 51.5 weight parts of an anti-corrosion rheological agent (fly ash microbead), 15 weight parts methanol, 0.5 weight parts of sulfonated melamine, 3 weight parts of EDTA, 20 weight parts of an organosilicon compound (a mixture of sodium methylsiliconate and polymethylvinyl siloxane at a mass ratio of 1:1), and 10 weight parts of stearate into a mixing container, and performing full and uniform stirring.

The weight ratio of the adsorption inhibitor in the oil shale semicoke is 0.25 wt %.

Example 6

The present example provided an oil shale semicoke adsorption inhibitor, wherein the adsorption inhibitor was prepared by the following steps: sequentially adding 50 weight parts of an anti-corrosion rheological agent (fly ash microbead), 15 weight parts of methanol, 2 weight parts of sulfonated melamine, 5 weight parts of EDTA, 20 weight parts of an organosilicon compound (a mixture of sodium methylsiliconate and sodium perfluorosiliconate at a mass ratio of 1:1), and 6 weight parts of stearate into a mixing container, and performing full and uniform stirring.

The weight ratio of the adsorption inhibitor in the oil shale semicoke is 0.12 wt %.

Example 7

The present example provided an oil shale semicoke adsorption inhibitor, wherein the adsorption inhibitor was prepared by the following steps: sequentially adding 50.2 weight parts of an anti-corrosion rheological agent (fly ash microbead), 13 weight parts of methanol, 0.8 weight parts of sulfonated melamine, 4 weight parts of EDTA, 25 weight parts of an organosilicon compound (a mixture of sodium methylsiliconate and sodium perfluorosiliconate at a mass ratio of 3:2), and 7 weight parts of stearate into a mixing container, and performing full and uniform stirring.

The weight ratio of the adsorption inhibitor in the oil shale semicoke is 0.16 wt %.

There are three kind of methods mixing the adsorption inhibitors obtained in examples 1-7 to prepare the concrete. Firstly, during a grinding process of the oil shale semicoke in a grinder, the adsorption inhibitor of the present disclosure is added into the grinder from a grinding head, so as to be uniformly dispersed and partially adsorbed on surfaces of oil shale semicoke powder particles. Secondly, the ground oil shale semicoke fine powder and the ground adsorption inhibitor fine power are mixed by a mixer according to the recommended weight ratio of the adsorption inhibitor in the oil shale semicoke and the mixture is stored to be used to mixed into the concrete. And Thirdly, when stirring the concrete in a mixer, the oil shale semicoke fine powder and the adsorption inhibitor fine power are separately mixed into the mixer in a predetermined weight ratio of the adsorption inhibitor in the oil shale semicoke. The first method is preferred among the three methods.

During the grinding process of the oil shale semicoke, the adsorption inhibitors obtained in examples 1-7 are added into the oil shale semicoke for modification according to the predetermined mixing amount (the first mixing method is selected), thus when the concrete is mixed, the oil shale semicoke powder having been modified by the materials obtained in examples 1-7 is mixed according to the amount of 20%, ordinary C30 concrete is designed and prepared using provisions of specification for mix proportion design of ordinary concrete JGJ/55-2011, cement is Eastern Hebei P.042.5 grade, sand is river sand with a fineness modulus of 3.36, crushed stone is blended in three grades of 5-10 mm, 10-20 mm, and 16-31.5 mm at a ratio of (5-10):(10-20):(16-31.5)=1:7:2, a water-binder ratio is 0.43, a sand ratio is 42%, and a water-reducing agent is a polycarboxylate high-performance water-reducing agent with the recommended adding amount of 1.0 wt %, and during the mixing process, the specific mixing amount of the water reducing agent is adjusted according to the state of the concrete. The performance index slump of the concrete mixture in different time periods is measured according to corresponding terms of GB/T50080-2016 standard for test method of performance on ordinary fresh concrete and the concrete mixture without the adsorption inhibitor is used as a control (Comparative Example). Specific performance results are shown in Table 1.

TABLE 1

Performance analysis of concrete mixture before and after adding oil shale semicoke adsorption inhibitor of the present disclosure

| Item | Comparative Example | Example 1 | Example 2 | Example 3 | Example 4 | Example 5 | Example 6 | Example 7 |
|---|---|---|---|---|---|---|---|---|
| Adding amount (%) of polycarboxylate water reducing agent | 1.30 | 1.00 | 1.00 | 1.05 | 1.10 | 1.05 | 1.00 | 1.10 |
| Slump of the concrete mixture exiting from mixer (mm) | 200 | 205 | 200 | 200 | 200 | 195 | 200 | 200 |
| Slump of the concrete mixture after 30 min standing(mm) | 80 | 195 | 200 | 205 | 200 | 180 | 190 | 200 |
| Slump of the concrete mixture after 60 min standing (mm) | Non | 175 | 180 | 180 | 190 | 160 | 175 | 185 |

It can be seen from data in Table 1, on the premise of same adding amount, same materials and same-grade concrete and a basically consistent initial state of the mixed materials, the unmodified oil shale semicoke (no adsorption inhibitor of the present application is mixed) mixed in the comparative example, it is found that the consumption amount of the polycarboxylate water reducing agent is far more than the recommended amount of the water reducing agent, and the slump of the concrete mixture is reduced to 80 mm at 30 min standing along with the mixing time of the concrete mixture, the fluidity of the concrete mixture is very weak, the slump is reduced to 0 mm after 60 min standing, and the workability is completely lost. The concrete mixed with the modified oil shale semicoke (mixed with the adsorption inhibitor in examples 1-7 of the present disclosure) has higher slump at 30 min or 60 min, indicating that the concrete still has good workability, the consumption of the water reducing agent is relatively lower particularly in example 1, example 2 and example 6, the water reducing agent consumption amount is consistent with the recommended mixing amount, the comprehensive cost is lower, and the concrete is more economical and practical.

In conclusion, the adsorption inhibitor is mixed into industrial solid waste oil shale semicoke powder, solves problems of strong water absorption, high adsorption of a water reducing agent, etc. of oil shale semicoke, and can also reduce power consumption during grinding due to a certain dispersing and grinding-aid effect, thereby realizing resource utilization of a large amount of the oil shale semicoke in cement-based concrete and high-value resource utilization of the oil shale semicoke.

The content of the present disclosure is not limited to those listed in the examples and any equivalent changes to the technical solution of the present disclosure by a person skilled in the art after reading the description of the present disclosure are all within the protection scope of the present disclosure.

What is claimed is:

1. An oil shale semicoke adsorption inhibitor, wherein the adsorption inhibitor is prepared by the following steps: sequentially adding 50-52.5 weight parts of an anti-corrosion rheological agent, 5-20 weight parts of methanol, 0.5-2 weight parts of sulfonated melamine, 2-5 weight parts of EDTA, 20-30 weight parts of an organosilicon compound, and 5-10 weight parts of stearate into a mixing container, and performing stirring well, and
    wherein the anti-corrosion rheological agent is a fly ash microbead.

2. The oil shale semicoke adsorption inhibitor according to claim 1, wherein the organosilicon compound is selected from at least two of sodium methylsiliconate, sodium perfluorosiliconate, polymethylvinylsiloxane and a cyclopentyl methacrylate-cubic polyhedral oligomeric silsesquioxane nanocomplex.

3. The oil shale semicoke adsorption inhibitor according to claim 1, wherein the stearate is a mixture of calcium stearate and zinc stearate.

4. The oil shale semicoke adsorption inhibitor according to claim 3, wherein a mass ratio of the calcium stearate and the zinc stearate is 2:1.

5. A method of using the oil shale semicoke adsorption inhibitor according to claim 1 in concrete preparation, wherein mixing the adsorption inhibitor of claim 1 into the oil shale semicoke, then adding the mixture into the concrete to be used, wherein a weight ratio of the adsorption inhibitor in the oil shale semicoke is 0.05-0.3 wt %.

6. The method of using the oil shale semicoke adsorption inhibitor according to claim 5, wherein a weight ratio of the adsorption inhibitor in the oil shale semicoke is 0.08-0.1 wt %.

7. The method of using the oil shale semicoke adsorption inhibitor according to claim 5, wherein in a process of grinding the oil shale semicoke in a grinder, adding the adsorption inhibitor into the grinder from a grinding head, so as to be ground into fine powder and adding the fine powder into the concrete to be used.

8. The method of using the oil shale semicoke adsorption inhibitor according to claim 5, wherein grinding the oil shale semicoke and the adsorption inhibitor into a fine power separately, then mixing the two fine powers by a mixer and adding the mixture into the concrete to be used.

9. The method of using the oil shale semicoke adsorption inhibitor according to claim 1, wherein adding an oil shale semicoke fine powder and the adsorption inhibitor fine power of claim 1 into the concrete separately when stirring the concrete, wherein a weight ratio of the adsorption inhibitor in the oil shale semicoke is 0.05-0.3 wt %.

10. The method of using the oil shale semicoke adsorption inhibitor according to claim 6, wherein in a process of grinding the oil shale semicoke in a grinder, adding the adsorption inhibitor into the grinder from a grinding head, so as to be ground into fine powder and adding the fine powder into the concrete to be used.

11. The method of using the oil shale semicoke adsorption inhibitor according to claim 6, wherein grinding the oil shale semicoke and the adsorption inhibitor into a fine power separately, then mixing the two fine powers by a mixer and adding the mixture into the concrete to be used.

12. The method of using the oil shale semicoke adsorption inhibitor according to claim 1, wherein adding an oil shale semicoke fine powder and the adsorption inhibitor fine power of claim 1 into the concrete separately when stirring the concrete, wherein a weight ratio of the adsorption inhibitor in the oil shale semicoke is 0.08-0.1 wt %.

* * * * *